June 6, 1961

W. W. YOUNG 2,986,864

ROTARY STALK CUTTER

Filed July 31, 1959

William W. Young
INVENTOR.

BY *Lawrence A. O'Brien*
*and Harvey B. Jacobson*
Attorneys

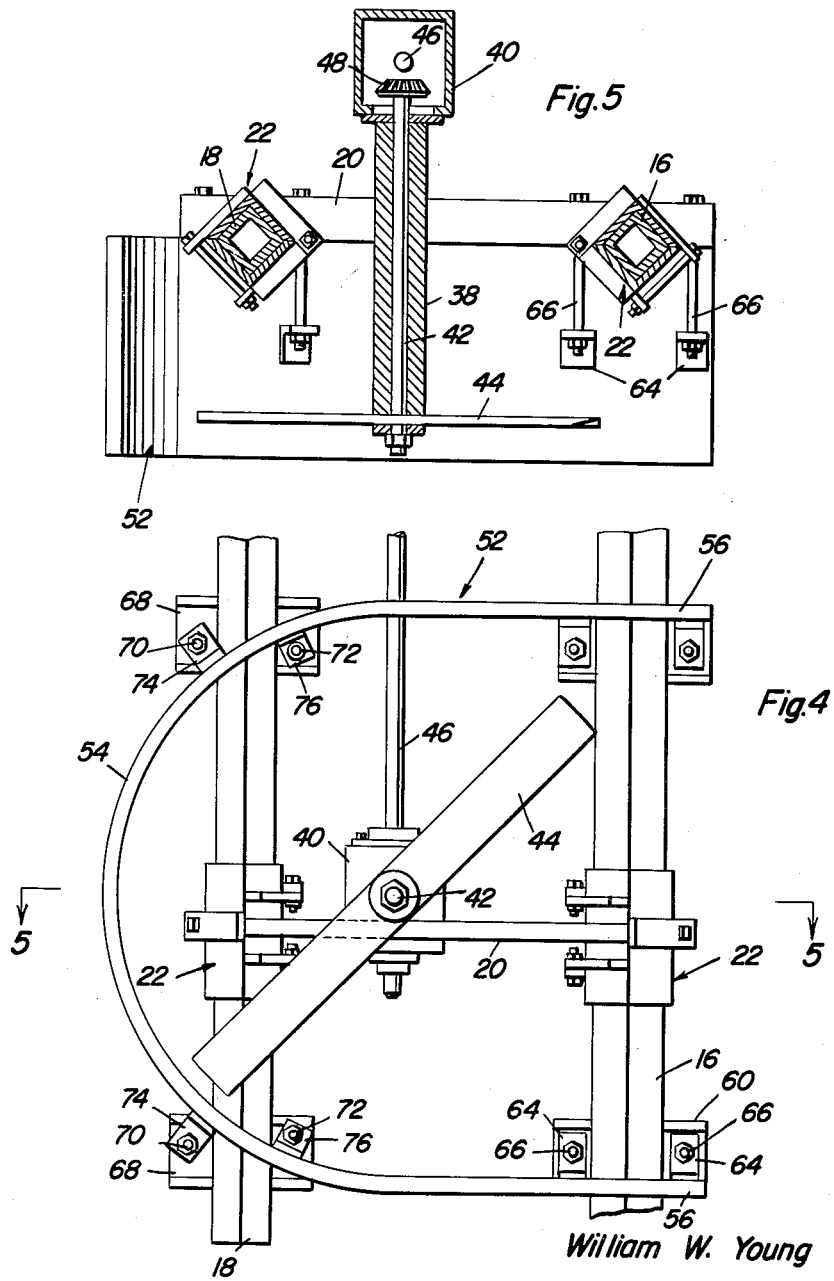

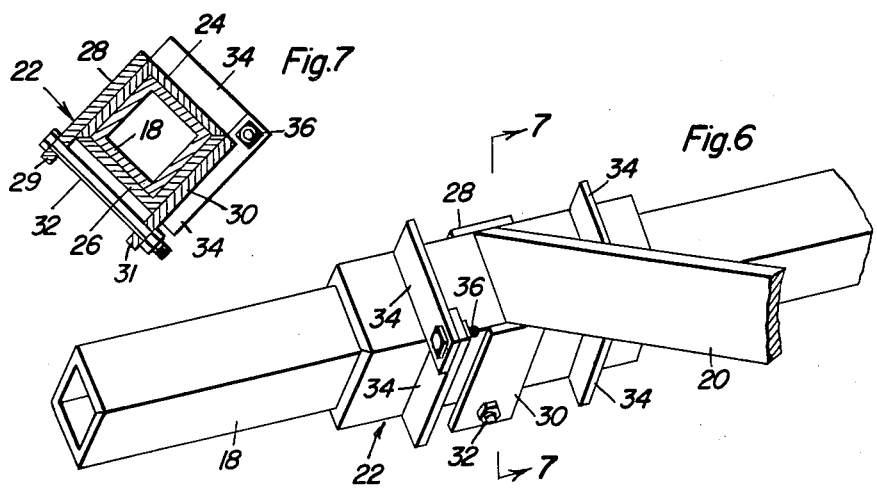
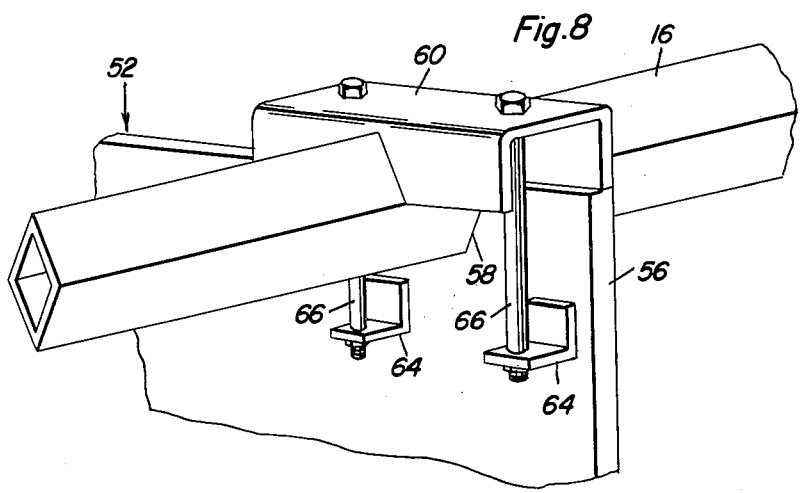
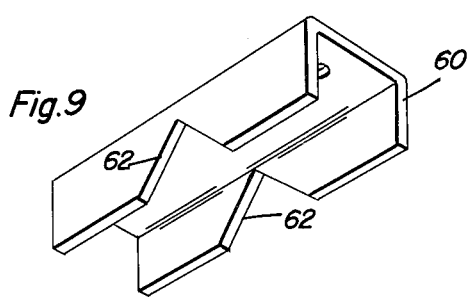

United States Patent Office 2,986,864
Patented June 6, 1961

2,986,864
ROTARY STALK CUTTER
William W. Young, P.O. Box 1032, Tahoka, Tex.
Filed July 31, 1959, Ser. No. 830,757
3 Claims. (Cl. 56—503)

This invention relates in general to new and useful improvements in agricultural equipment, and more particularly seeks to provide a novel and efficient stalk cutter.

In many parts of the country the major crop is a row crop, such as cotton, corn, etc. These crops are planted in parallel rows, generally equally spaced, and approximately 38 to 40 inches apart. After the crop has been gathered, the stalks are left standing and present a problem. If the land is bedded with the stalks standing, the stalks cannot be covered to cause decay, therefore, the soil is not fertilized by the plants. Another problem arising is the fact that the stalks left standing are unsightly and cause clogging of plows and moving parts of the agricultural equipment being used to till the soil.

It is therefore an object of the invention to provide an improved stalk or plant shredder which shreds or pulverizes any object coming into contact with the machine, the machine being designed to be carried by a tractor and supported by the power lift arms of the tractor for vertical positioning.

Another object of this invention is to provide an improved cutter for plant stubbles, the cutter being of a construction so as to not only cut the plant stubble, but also to shred the plant stubble, the machine being designed to be driven from a tractor power take-off and having swinging rotary cutting blades.

Still another object of the invention is to provide an efficient stalk shredding machine of the type having a frame from which cutting members depend, the frame being provided with means for attaching the same two power lift arms of a tractor so as to be readily mounted on and carried by a tractor and be vertically adjustable by the operator of the tractor to facilitate the crossing of terraces, ditches, etc. without stopping the tractor.

A further object of the invention is to provide an improved stalk cutter and shredder which is directly mounted on the rear of a tractor and supported solely by the tractor so that the tractor may be readily maneuvered at the end of a row and thus greatly reduce the turning time of the entire machine at the ends of rows.

A still further object of the invention is to provide a novel stalk cutter which includes a plurality of rotary blades, each of the blades having associated therewith shields disposed rearwardly thereof so that the blades also shred the stalks cut thereby as the stalks fall within the confines of the shields.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is an enlarged fragmentary plan view of an endmost one of the cutter units and shows the specific details thereof as viewed from the bottom;

FIGURE 5 is an enlarged fragmentary transverse sectional view taken substantially upon the plane indicated by the section line 5—5 of FIGURE 4 and shows further the specific details of one of the cutter units;

FIGURE 6 is an enlarged fragmentary perspective view with parts shown in section showing the details of the frame construction;

FIGURE 7 is an enlarged fragmentary transverse sectional view taken substantially upon the plane indicated by the section line 7—7 of FIGURE 6 and shows further the details of the connection between a tool bar and a connecting member of the frame;

FIGURE 8 is an enlarged fragmentary perspective view showing the connection between a forward portion of a shield and a tool bar of the frame; and FIGURE 9 is an enlarged bottom perspective view showing the details of one of the clamps for securing a shield to a tool bar.

Figure 1:
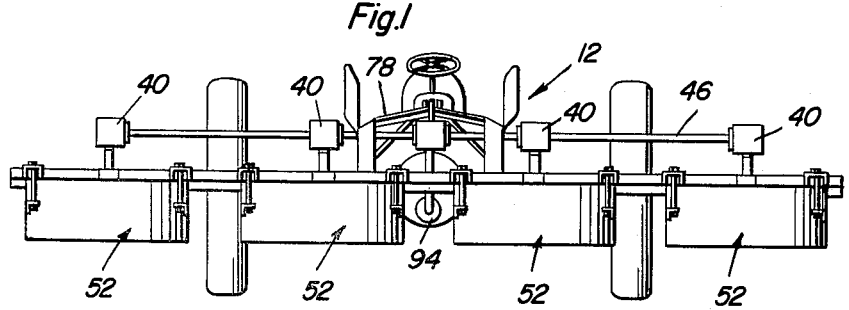
FIGURE 1 is a rear elevational view of the stalk cutter attached to the rear of a tractor and supported thereby.

Referring now to the drawings in detail, it will be seen that there are illustrated the details of the stalk cutter, which is the subject of this invention, the stalk cutter being generally referred to by the numeral 10. The stalk cutter 10 is shown mounted on a conventional farm tractor, generally referred to by the numeral 12. The stalk cutter 10 includes a frame which is generally referred to by the numeral 14.

The frame 14 is formed of a pair of tool bars 16 and 18, the tool bar 16 being a forward tool bar and the tool bar 18 being a rear tool bar. The tool bars 16 and 18 are connected together at spaced intervals by connecting members 20. Referring now to FIGURES 6 and 7, it will be seen that each of the connecting members 20 is provided with a clamp assembly, generally referred to by the numeral 22 for securing the same in an adjusted position to one of the tool bars 16 and 18. The clamp assembly includes an upper inverted angle member 24 and a lower upright angle member 26, the angle members 24 and 26 combining to form a square, relatively short tube in which the respective tool bar is received. The upper angle member 24 is provided with a strap 28 and the lower angle member 26 is provided with a strap 30, the straps 28 and 30 being disposed in parallel relation and having ends 29 and 31 projecting beyond their respective angle members. The projecting end portions of the straps 28 and 30 are connected together by removable bolt 32.

Both of the angle members 24 and 26 are provided with a pair of upstanding straps 34 which are disposed on opposite sides of the straps 28 and 30. The straps of each pair are slightly offset and are secured together by bolts 36, as is best shown in FIGURE 6. The connecting member 20 is suitably secured to a central part of the uppermost angle member 24, also best shown in FIGURE 6.

It is to be understood that the connection between the connecting member 20 and its respective tool bars is adjustable. In this manner the spacing of the connecting members 20 may be varied as is desired.

Figure 3:
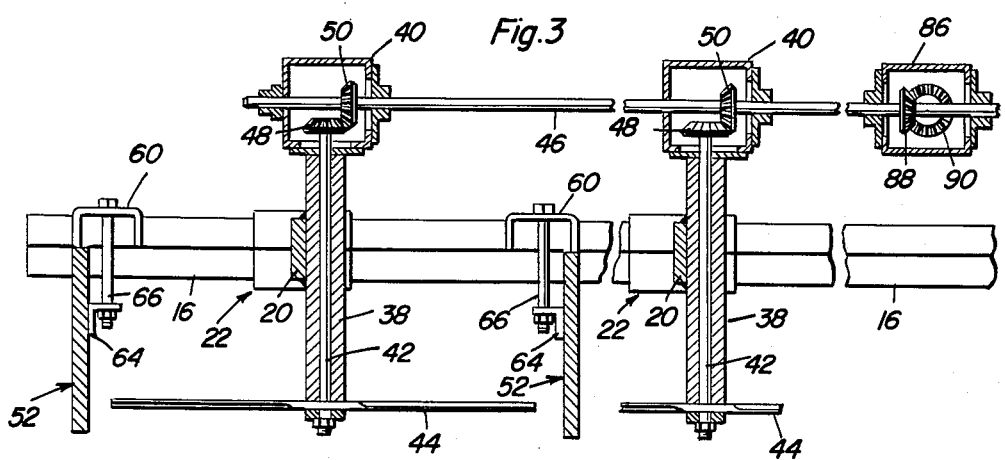
FIGURE 3 is an enlarged fragmentary vertical sectional view taken substantially upon the plane indicated by the section line 3—3 of FIGURE 2 and shows the details of the specific drive for the stalk cutter, intermediate portions of the stalk cutter being omitted.

Reference is now had to FIGURES 3, 4 and 5. It will be seen that each of the connecting members 20 has secured thereto a vertically extending shaft housing 38. A gear box 40 is supported at the upper end of the shaft housing 38. A vertical shaft 42 extends through the shaft housing 38 and is rotatably journaled therein. A rotary cutter blade 44 is secured to the lower end of the shaft 42 for rotation therewith.

A shaft 46 extends through all of the gear boxes 40 and is disposed generally parallel to the tool bars 16 and 18. In each of the gear boxes 40 a bevel gear 48 is secured to the upper end of its respective shaft 42. A second bevel gear 50 is carried by the shaft 46 and is meshed with its respective bevel gear 48. The manner in which the shaft 46 is driven will be described in detail hereinafter.

As is best shown in FIGURE 4, a shield, generally referred to by the numeral 52 is associated with each of the cutter blades. The shield 52 has a semi-circular rear portion 54 which is concentric with the shaft 42. The shield 52 also includes a pair of forwardly extending side members 56. It is to be noted that the shield 52 extends both rearwardly of the rear tool bar 18 and forwardly of the forward tool bar 16.

As is best shown in FIGURE 8, the individual side member 56 of the shield 52 underlies the forward tool bar 16 and is provided with a V-notch 58 receiving the lower portion of the forward tool bar 16. The shield 52 is clamped against the underside of the forward tool bar 16 by means of a clamp member 60 which is generally channel shaped in cross-section and which has V-notches 62 formed in the underside thereof, the V-notches 62 being of a size to receive the upper portion of the forward tool bar 16. A pair of angle brackets 64 are suitably secured to the inner face of the forward portion of the shield 52. The angle brackets 64 are disposed on opposite sides of the forward tool bar 16 and carry bolts 66 which extend through the clamp member 60 and pull the clamp member 60 down onto the top portion of the forward tool bar 16 so as to clamp the shield 52 thereto.

The rear portion 54 of the shield 52 is also notched to receive the underside of the rear tool bar 18. The rear portion of the shield 52 is clamped against the underside of the rear tool bar 18 by a pair of clamp members 68 which are identical to the clamp members 60. The clamp members 68 are secured in place by a pair of bolts 70 and 72, the bolt 70 passing through an angle bracket 74 secured to the exterior surface of the shield 52, and the bolt 72 passing through an angle bracket 76 secured to the interior surface of the shield 52.

Figure 2:
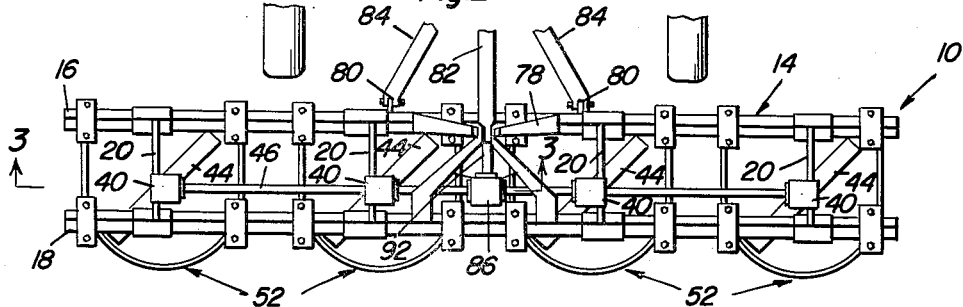
FIGURE 2 is a plan view of the rotary stalk cutter of FIGURE 1, only the rear wheels and power lift arms of the tractor being illustrated.

Referring now to FIGURES 1 and 2 in particular, it will be seen that the frame 14 is provided with a central hitch assembly 78 and a pair of outer hitch ears 80, the central hitch assembly 78 being disposed above the frame 14. The tractor 12 includes power lift arms of which 82 is a central upper power lift arm and 84 are outer lower power lift arms. The power lift arm 82 is connected to the hitch assembly 78 and the power lift arms 84 are connected to the ears 80. In this manner the entire stalk cutter 10 may be supported by the tractor 12 at the desired elevation for movement with the tractor 12.

As is best shown in FIGURE 2 a central gear box 86 is supported by the hitch assembly 78. The gear box 86 has the main drive shaft 46 extending therethrough, and as is best shown in FIGURE 3, the main drive shaft 46 is provided with a bevel gear 88 which is meshed with a bevel drive gear 90 disposed within the gear box 86. The bevel gear 90 is carried by a drive shaft 92 which is coupled to the tractor power take-off 94, as is best shown in FIGURE 1. In this manner the tractor power take-off is utilized to drive the individual cutter blades 44 in unison.

From the foregoing, it will be seen that the stalk cutter 10 is completely supported by the farm tractor 12 and may be maneuvered therewith. Further, since the stalk cutter 10 is supported from the tractor 12 by the power lift arms thereof, the elevation of the stalk cutter 10 may be readily varied, as is desired. Additionally, since each of the cutter blades of the stalk cutter is surrounded at the rear thereof with a shield, as the individual stalks are cut, they will remain in contact with the cutter blades and thus will be shredded by the same blade which cuts them down.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A rotary stalk cutter adapted to be supported by a tractor comprising, a frame including a pair of substantially parallel bars disposed transversely to the direction of movement of said cutter, connecting members extending between and perpendicularly to said bars, a plurality of upright shafts mounted on said connecting members for rotary movement, a blade secured to each of said shafts, drive means interconnecting said shafts, hitch means connected to said frame for attachment to said tractor and a plurality of substantially semi-circular shields carried by said frame rearwardly of each blade, each shield including a pair of side members interconnected by an arcuate rear portion extending rearwardly of the blade and having a center of curvature coincident with said shaft to enable shredding by each blade, of stalks cut by the blade.

2. The combination of claim 1 wherein said drive means includes a gear box for each shaft supported on said connecting members.

3. The combination of claim 1 wherein said side members are connected to the frame by the parallel bars.

References Cited in the file of this patent

UNITED STATES PATENTS

| | | |
|---|---|---|
| 2,489,204 | Sprick et al. | Nov. 22, 1949 |
| 2,681,536 | Kuhary et al. | June 22, 1954 |
| 2,720,740 | Price | Oct. 18, 1955 |
| 2,743,567 | Martin | May 1, 1956 |
| 2,753,674 | Cunningham, et al. | July 10, 1956 |
| 2,782,585 | Hervey | Feb. 26, 1957 |
| 2,891,369 | Rietz | June 23, 1959 |
| 2,952,961 | Engler | Sept. 20, 1960 |